(12) United States Patent
Naomachi

(10) Patent No.: US 6,259,963 B1
(45) Date of Patent: Jul. 10, 2001

(54) EQUIPMENT, METHOD AND COMPUTER PROGRAM PRODUCT FOR DETERMINING POSITIONS OF INSPECTION TERMINALS ON PRINTED WIRING BOARD

(75) Inventor: Junichi Naomachi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/167,732

(22) Filed: Oct. 7, 1998

(30) Foreign Application Priority Data

Oct. 7, 1997 (JP) .................................................. 9-274708

(51) Int. Cl.⁷ .................................................. G06F 19/00
(52) U.S. Cl. .................................................. 700/121; 716/8
(58) Field of Search ................................ 700/56–59, 121, 700/108; 716/8–18; 702/33, 34, 81–84

(56) References Cited

U.S. PATENT DOCUMENTS

| | | | |
|---|---|---|---|
| 5,581,632 | * 12/1996 | Koljonen et al. | 382/150 |
| 5,764,536 | * 6/1998 | Yamamoto et al. | 701/81 |
| 5,822,210 | * 10/1998 | Kobayashi et al. | 700/121 |
| 5,953,447 | * 9/1999 | Jin | 382/145 |
| 5,995,232 | * 11/1999 | Van Der Ven | 356/395 |
| 6,002,650 | * 12/1999 | Kuribayashi et al. | 700/117 |
| 6,014,507 | * 1/2000 | Fujii | 716/12 |
| 6,023,569 | * 2/2000 | Yun | 716/15 |
| 6,064,759 | * 5/2000 | Buckley et al. | 382/154 |
| 6,118,894 | * 9/2000 | Schwartz et al. | 382/151 |

FOREIGN PATENT DOCUMENTS

| | | |
|---|---|---|
| 62279471 | * 12/1987 | (JP) . |
| 4-236670 | 8/1992 | (JP) . |
| 4-352346 | 12/1992 | (JP) . |
| 5-63327 | 3/1993 | (JP) . |
| 5-256909 | 10/1993 | (JP) . |
| 5-258013 | 10/1993 | (JP) . |
| 8-30647 | 2/1996 | (JP) . |
| 8-220179 | 8/1996 | (JP) . |

* cited by examiner

Primary Examiner—William Grant
Assistant Examiner—Zoila Cabrera
(74) Attorney, Agent, or Firm—Sughrue, Mion, Zinn, Macpeak & Seas, PLLC

(57) ABSTRACT

An equipment for determining inspection terminals on a printed circuit board comprises memory means which stores the arrangement of electronic parts and pads and the characteristics of a jig placed on the inspection terminals, prohibition region generation means which generates prohibition regions where inspection terminals should not be generated, and through hole position determination means which determines the position of inspection terminals in the region excluding the prohibition region generated by prohibition region generation means.

20 Claims, 8 Drawing Sheets

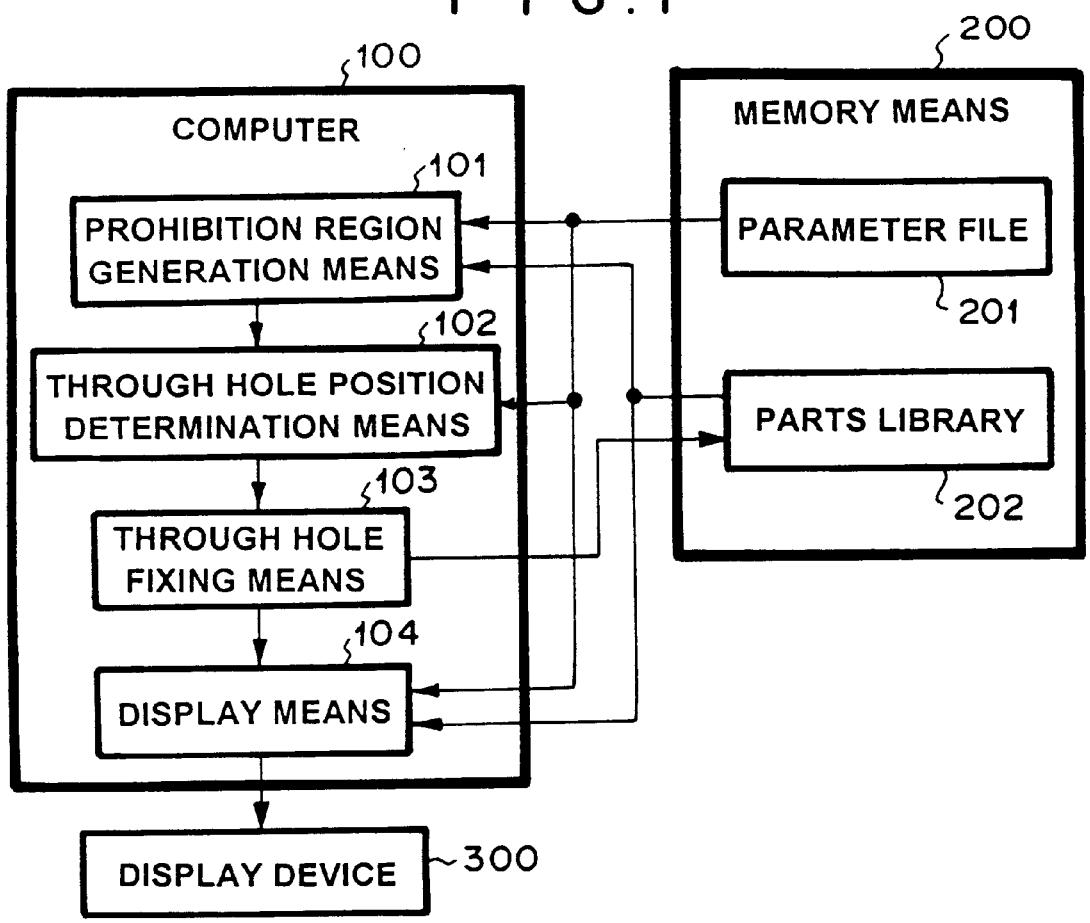

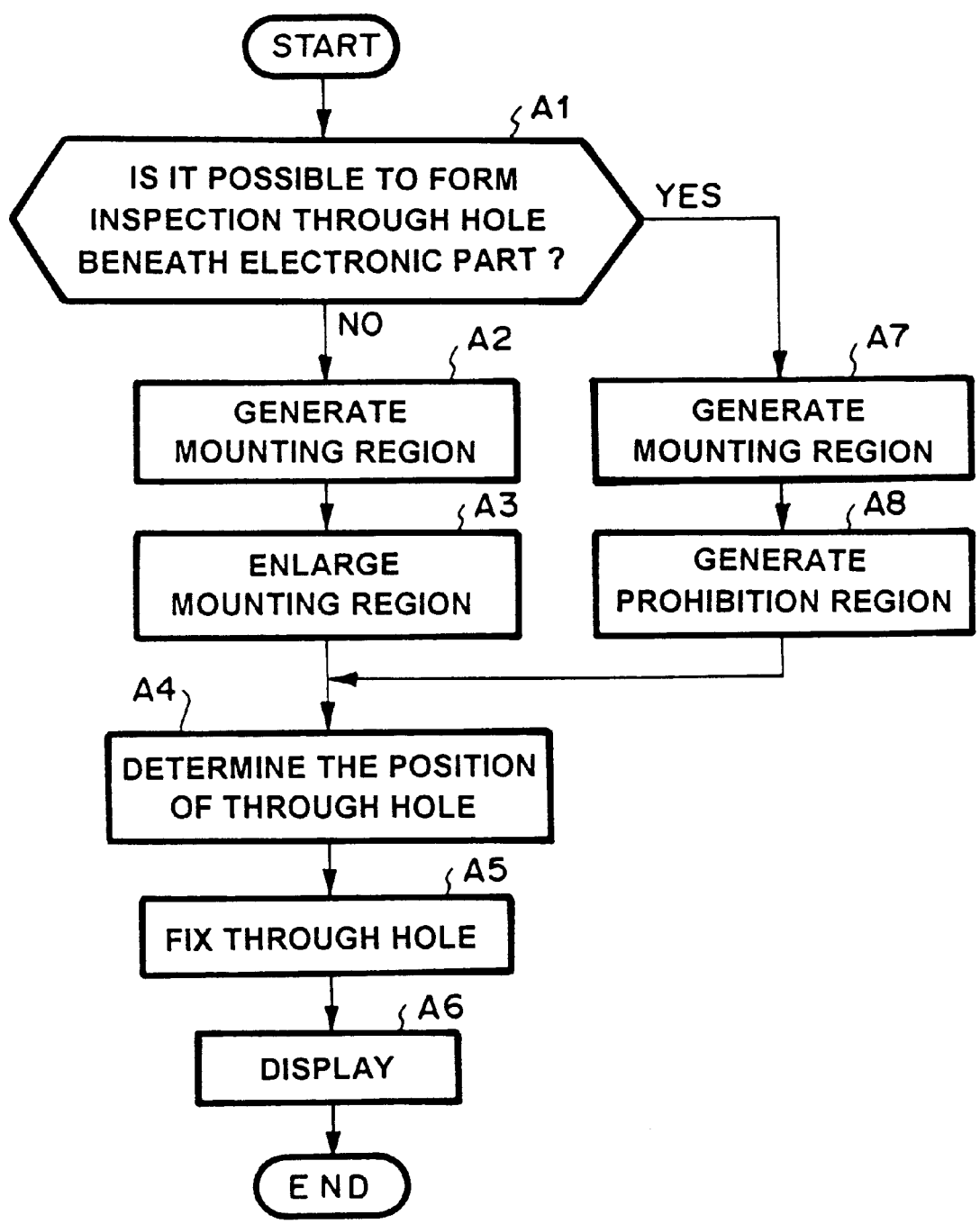

CLEARANCE DETERMINED BY MANUFACTURING RULE

F I G. 13
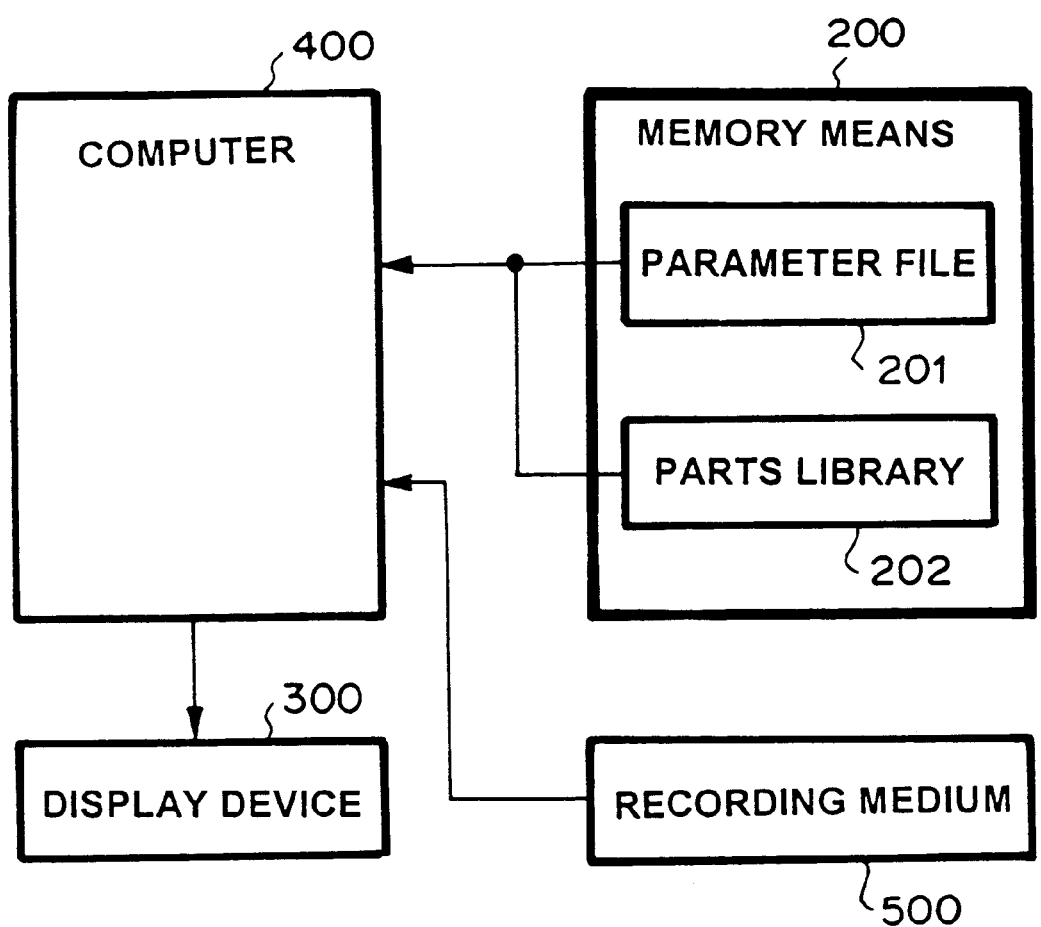

EQUIPMENT, METHOD AND COMPUTER PROGRAM PRODUCT FOR DETERMINING POSITIONS OF INSPECTION TERMINALS ON PRINTED WIRING BOARD

BACKGROUND OF THE INVENTION

1. Technical Field of the Invention

The present invention relates to an equipment, method and computer program product for determining positions of inspection terminals and particularly, for determining the positions of inspection terminals which are contacted by a jig to inspect electronic parts on a printed wiring board.

2. Description of the Prior Art

Hitherto, designers in the fields of computer aided design (CAD) have decided the positions of inspection terminals by observing the arrangements of electronic parts and wiring patterns on the display of the CAD system.

Referring to an example of such a CAD system disclosed in JPA 5-258013 (1993), conductor patterns are classified by colors to indicate whether the inspection terminals should be provided or not. Further, through holes for wiring are used in the above-mentioned JPA (laid-open Japanese Patent).

However, the conventional CAD systems have a disadvantage that they can not decide the positions of inspection terminals without any help of designers, because conventional systems are limited to merely show whether or not an inspection terminal is required there.

Further, the conventional systems have another disadvantage that an inspection jig can not be placed on the through holes which are used for inspection terminals, because the size and length of the inspection jig are not taken into consideration.

SUMMARY OF THE INVENTION

Therefore, an object of the present invention is to provide an equipment for determining positions of inspection terminals without any help of designers.

Another object of the present invention is to provide an equipment for determining positions of inspection terminals, wherein a jig is certainly placed on inspection terminals by taking the characteristics of the inspection jig into consideration.

According to the present invention, there is provided an equipment for determining positions of inspection terminals with which an inspection jig is contacted to inspect electronic parts mounted through pads on a printed wiring board, which comprises: a memory means for storing arrangement information about arrangements of the electronic parts and the pads, and jig information about characteristics of the jig; a prohibition region generation means for generating, by using the arrangement information and the jig information, prohibition regions where the inspection terminals must not be provided; and an inspection terminal position determination means for determining the positions of the inspection terminals in regions excluding the prohibition regions.

Also, the prohibition region generation means may comprises: a mounting region generation means for acquiring, by using the arrangement information, mounting regions which include the electronic parts and the pads; and enlargement means for enlarging the mounting regions on the basis of the jig information.

Further, the jig information may include such a minimum clearance that the jig is apart from the pad; and the enlargement means enlarges the mounting regions by the minimum clearance.

Furthermore, the mounting region generation means acquires representative pads which represent a plurality of pads which stand in line along the peripheries of the electronic parts; acquires four lines which are parallel to the row of the pads and are tangent to the edge of the representative pads; and acquires a region surrounded by the four lines as the mounting region.

The equipment for determining positions of inspection terminals according of the present invention may include a electronic parts judgement means for judging whether or not the inspection terminals can be provided beneath the electronic parts on the printed wiring board, wherein the electronic parts judgement means excludes, from the prohibition region, a region surrounded by lines distant by a prescribed distance from edges of the electronic parts toward the inner sides of the electronic parts, when the inspection terminals can be provided beneath the electronic parts on the printed wiring board.

The equipment for determining positions of inspection terminals of the present invention may further include an inspection terminal fixing means for preventing positions of the inspection terminals determined by the inspection terminal determination means from being deleted or moved.

The equipment for determining positions of inspection terminals of the present invention may furthermore include a wiring means for wiring the printed wiring board, which the wiring means judges whether or not the pads included in wiring paths are connected with the inspection terminals wherein the inspection terminals are used as wiring terminals, when the pads included in wiring paths are connected with the inspection terminals.

There is also provided, according to the present invention, a method for determining positions of inspection terminals with which an inspection jig is contacted to inspect electronic parts mounted through pads on a printed wiring board, which comprises the steps of: storing arrangement information about arrangements of the electronic parts and pads, and jig information about characteristics of the jig; generating, by using the arrangement information and the jig information, prohibition regions where said inspection terminals must not be provided; and determining the positions of the inspection terminals in regions excluding the prohibition regions.

As described above, inspection through holes are located automatically at the positions which can be inspected by a jig, because the prohibition region generation means generates prohibition regions where any inspection terminal should not be provided, and through hole position determination means determines positions for inspection through holes at regions excluding the prohibition regions generated by prohibition region generating means.

BRIEF EXPLANATION OF THE DRAWINGS

FIG. 1 is a block diagram of the first embodiment of the present invention.

FIG. 2 is a content of parameter file 201.

FIG. 3 is a flow chart for explaining the action of the first embodiment of the present invention.

FIG. 13 is a block diagram of the second embodiment of the present invention.

PREFERRED EMBODIMENT OF THE INVENTION

Figure 4:
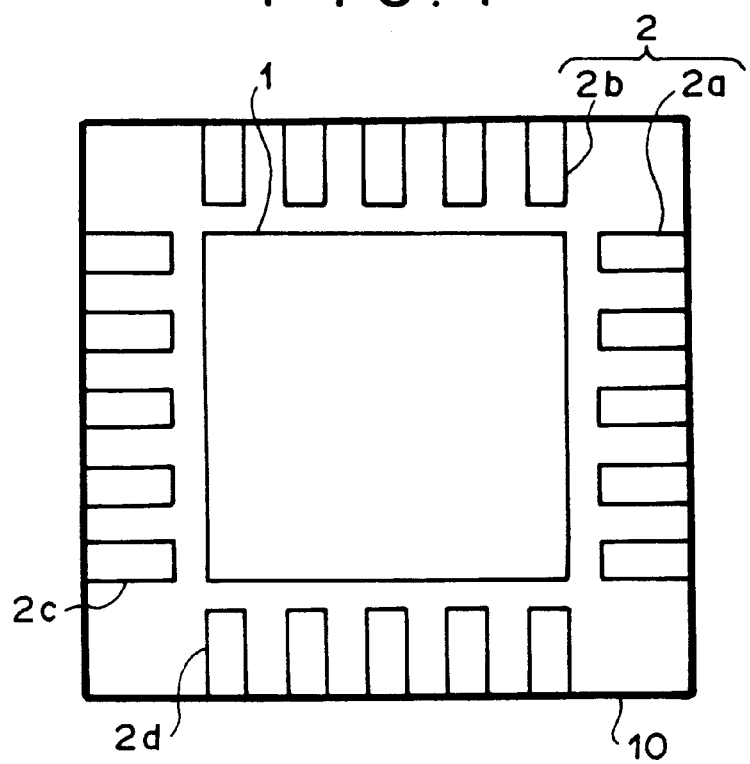
FIG. 4 is a plan view of mounting region 10.
Figure 5:
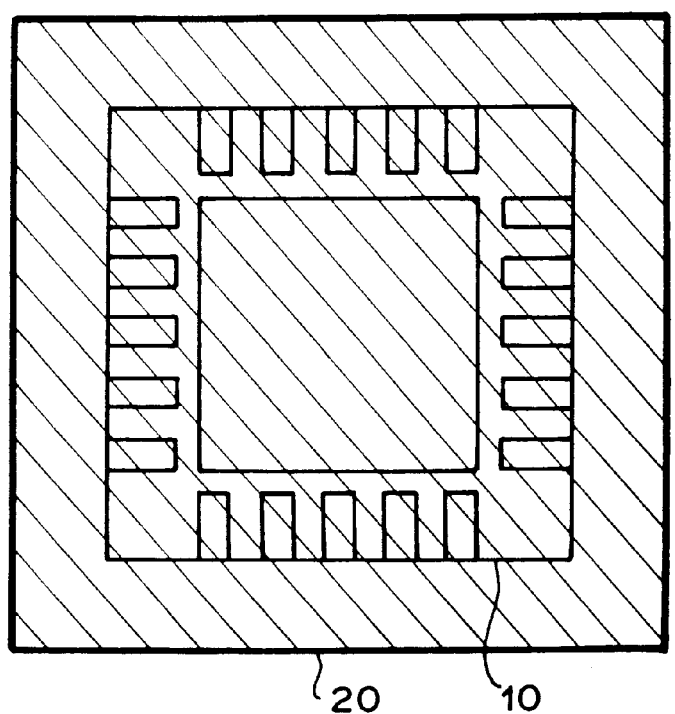
FIG. 5 is a plan view of prohibition region 20.
Figure 6:
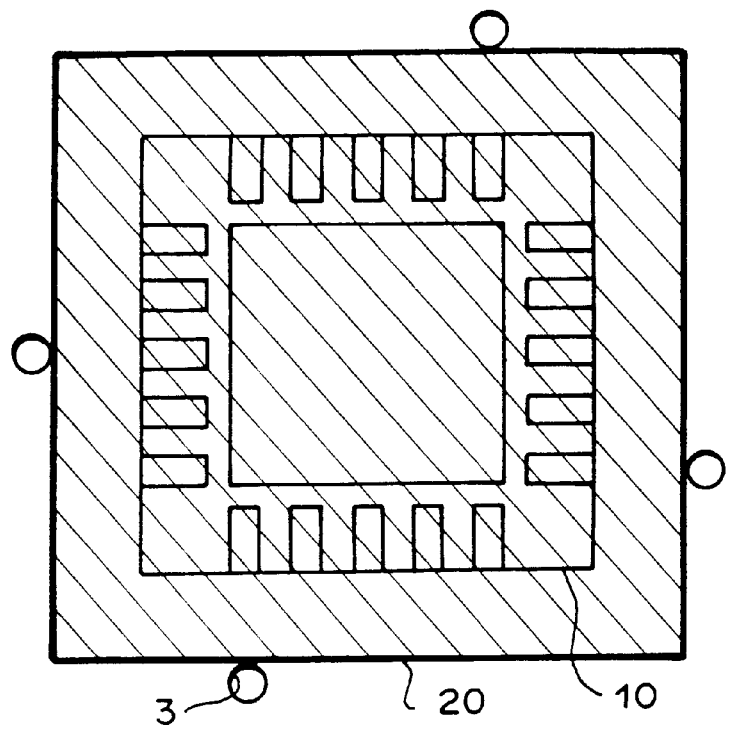
FIG. 6 is a plan view of inspection through hole 3.
Figure 7:
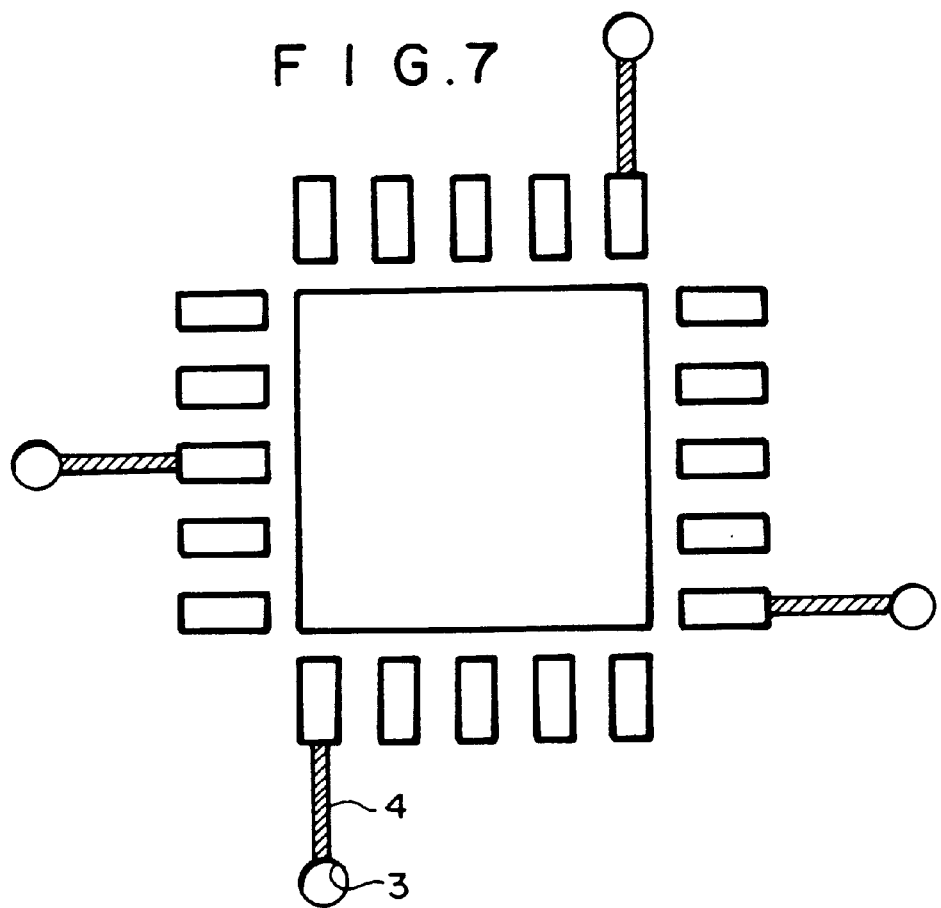
FIG. 7 is an example of the content displayed on display device 300.
Figure 8:
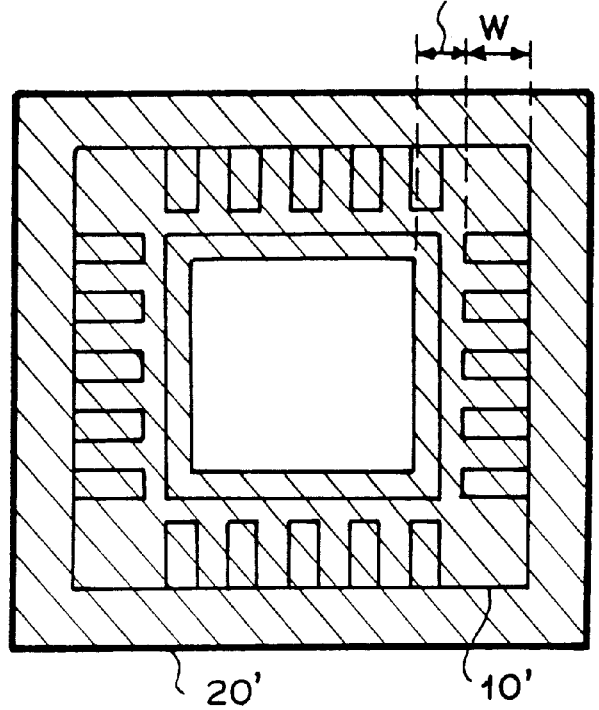
FIG. 8 is a plan view of prohibition region 10'.

Referring to the drawings, preferred embodiments of the present invention are explained.

An equipment for determining positions of inspection terminals of the first embodiment of the present invention comprises computer 100 acting under program control, memory device 200, and display device 300.

Computer 100 includes prohibition region generation means 101, through hole position determination means 102, through hole fixing means 103, and display means 104.

Prohibition region generation means 101 generates prohibition regions where any inspection terminal should not be provided. Only the inspection through holes are referred to in the explanation of the first embodiment of the present invention, although an inspection via is also used as an inspection terminal.

Through hole position determination means 102 determines positions for inspection through holes at regions excluding the prohibition regions generated by prohibition region generating means 101.

Through hole fixing means 103 fixes the positions of the inspection holes determined by through hole determination means 102, so that the determined inspection through holes are not deleted, nor changed in position during wiring.

Display means 104 displays on display device 300 the distributed electric electronic parts and the inspection through holes whose positions are fixed by through hole fixing means 103.

Memory device 200 stores parameter file 201 and electronic parts library 202. Parameter file 201 is connected with prohibition region generating means 101 and through hole position determining means 102 to supply design data for them. Electronic parts library 202 stores design data of electronic parts and pad, as in conventional CAD systems.

Parameter file 201 stores names 2011 of electric electronic parts according to their classification, minimum clearance value 2012, and permission flag 2013 for permitting the uses of the regions beneath the electric electronic parts. Parameter file 201 is stored beforehand in memory device 300.

Names of electronic parts 2011 are specified according to their classification for identifying them. Therefore, identifiers may be used in place of names.

Minimum clearance value 2012 is a value determined on the basis of sizes of electronic parts such as probes of an inspection jig which is placed on inspection through holes. Concretely, the sizes of electronic parts are such values as heights of electronic parts and shapes such as diameter and tapered angle of the edges of jigs. The minimum clearance value 2012 is stored beforehand in electronic parts library 202 by designers.

Permission flag 2013 indicates whether or not a region beneath an electric component on a printed wiring board can be used as a region for an inspection through hole. Permission flag 0 inhibits its use, while permission flag 1 permits its use.

After the fixation of the positions of inspection through holes, display device 300 displays the distributed electronic parts, pads and the inspection through holes whose positions are fixed by through hole fixing means 103, as shown in FIG. 1.

Next, the action of the present invention is explained.

The processing steps in the equipment and method of the present invention are taken after the electronic parts were arranged, and before the wiring positions are decided.

Prohibition region generation means 101 selects one by one sequentially an electronic part, and decides whether or not an inspection through hole can be formed in the region of printed wiring board beneath the electronic part, on the basis of the information indicated by permission flag 2013 in parameter file 201 (step A1 in FIG. 3). Quad Flat Package (QFP) and Small Outline Package (SOP) are examples of the electronic parts under which an inspection hole can be formed. However, the formation of the inspection hole is prohibited by permission flag 2013 even for QFP and SOP, if another electronic part is mounted on the back of the printed wiring board, because an inspection jig can not be placed in this case. An inspection via may be formed at the place which does not confront any part, if there is a danger of short circuit due to exposure of the inspection hole beneath the electronic part.

Here, the processing step for determining the position of the inspection through hole is explained, when it can not be formed beneath the electronic part on the printed wiring board.

In step A1, QFPa1 is decided to be an electronic part under which any inspection through hole can not be formed on the printed wiring board, as shown in FIGS. 1,2,3 and 4. Accordingly, in step A2, prohibition region generation means 101 acquires the data of QFPa1 and pads 2 around QFPa1 from part library 202 to generate mounting region 10 including QFPa1 and pads around QFPa1.

In step A3, prohibition region generation means 101 generates prohibition region 20 by adding minimum clearance value 2012 of QFPa1 stored in electronic parts library 20001 to mounting area 10.

In step 4, through hole position determination means 102 determines, on the basis of mounting region 10 and prohibition region 20, the positions of inspection through hole 3 in the region which does not include prohibited region 20. Concretely, inspection through hole 3, for example, may be positioned at the shortest distance from the pad around which inspection through hole 3 is formed, and it also may be positioned at the point distant as much as the radius of inspection through hole 3 from the outer edge of prohibition region 20.The inspection through hole may be determined by an iteration method such that the position of the inspection through hole 3 is generated at a prescribed distance from a pad ,until it reaches the outer side of prohibition region 20. Further, a function such as a fan out function provided in the automatic CAD system may be used. The above-mentioned fan out function is a function which enables to form a via hole or a through hole by extracting a short escape wire from the pad. The escape wire is made long enough to reach the outer side of prohibition region 20 to determine the position of inspection through hole 3.

In step 5, through hole fixing means 103 fixes the positions of inspection holes determined by through hole position determination means 102, so that these positions are not deleted, nor changed, as shown in FIGS. 1 and 3. The data of the fixed positions are stored in electronic parts library 202.

In step A6, display device 300 displays electronic parts 1, pads 2, inspection through hole 3, and wire 4 which connects one of the pads 2 and inspection through hole 3. The display panel of display device 300 shows the positional relations between them, while display means 104 does not display mounting region 10 nor prohibition region 20 on display device 300.

Next, the processing step for determining positions of the inspection through hole is explained, when it can be formed beneath the electronic part on the printed wiring board.

In step A1, QFPa1' is decided to be the electronic part under which an inspection through hole can be formed on the printed wiring board, as shown in FIGS. 1,2. Accordingly, in step A7, similarly to step A2, prohibition region generation means 101 acquires the data of QFPa1' and pads 2 around QFPa1 from part library 202 to generate mounting region 10 including QFPa1' and pads around QFPa1'.

In step A8, prohibition region generation means 101 generates prohibition region 20' by using mounting area 10' determined in step A7 and a clearance value determined by manufacturing rule. Concretely, a new region is determined by generating new border inside mounting region 10', wherein the new border lies at the distance which is calculated on the basis of both the pad length W and the above-mentioned clearance determined by manufacturing rule, from the border of mounting region 10'. Prohibition region 20' is obtained by excluding the above-mentioned new region from mounting region 10'. The above-mentioned clearance value is such a distance, for example 100 to 200 $\mu$m, that prohibition region 20' is apart from the pad. The above-mentioned clearance value is acquired from electronic parts library 202 in memory means 200.

Figure 9:
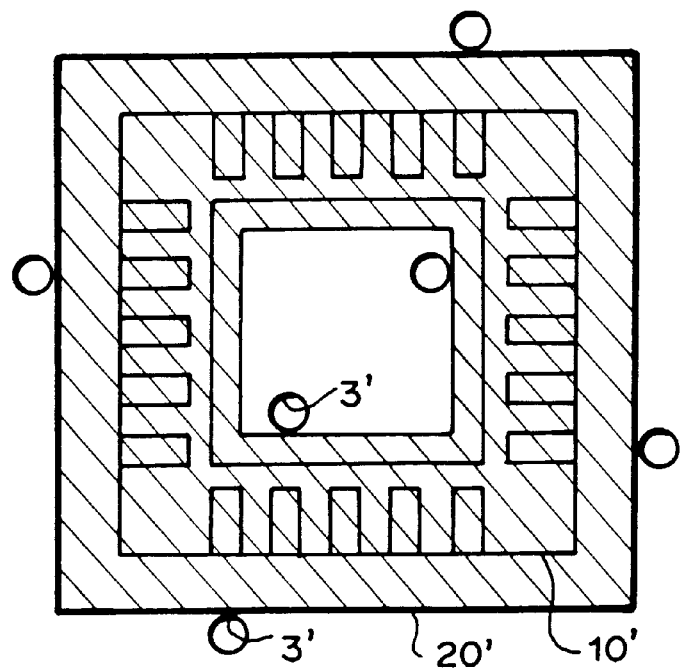
FIG. 9 is a plan view of inspection through hole 3'.

In step 4, through hole position determination means 102 determines, on the basis of mounting region 10' and prohibition region 20', the positions of inspection through hole 3' in the region which does not include prohibited region 20' as shown in FIGS. 1,3 and 9. Concretely, an inspection through hole 3', for example, may be positioned at the shortest distance from the pad around which inspection through hole 3' is formed, and at the same time at the inner or outer point distant as far as the radius of inspection through hole 3' from the edge of prohibition region 20. The inspection through hole may be determined by an iteration method such that the position of the inspection through hole 3' is generated at a prescribed distance inner or outer from a pad, until it reaches the outer side of prohibition region 20. Further, a function such as a fan out function provided in the automatic CAD system may be used. The above-mentioned fan out function is a function which enables to form a via hole or through hole by extracting a short escape wire from the pad. The escape wire is made long enough to reach the outer edge of prohibition region 20.

Steps A5 and A6 are followed hereafter.

Next, steps A2 and A7 are explained in detail. Here, it is assumed that the position of pads 2 and 2' is represented by the coordinates of their centers and electronic parts are square.

Figure 10:
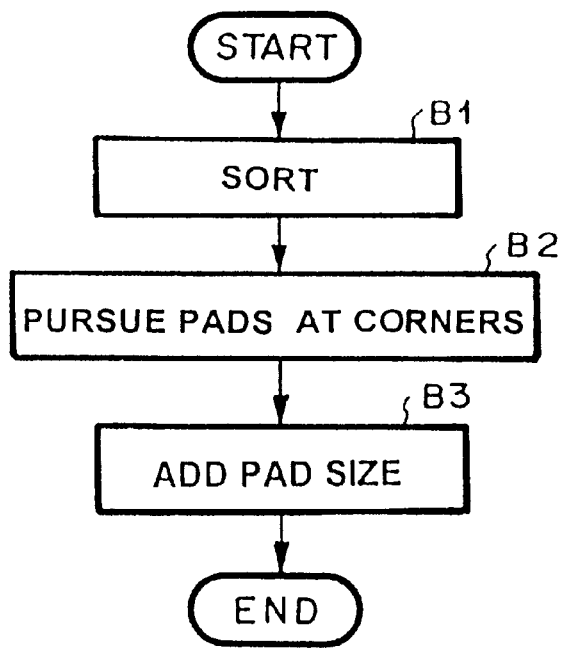
FIG. 10 is a flow chart of step A2 and A7 in the first embodiment of the present invention.

In step B1, X and Y coordinates of pads 2 are sorted respectively, as shown in FIG. 10.

Representative pads in each row surrounding an electronic part are determined, as shown in FIGS. 4 and 10. Concretely, the pads positioned at the corners of the electronic part are pursued in step B2. Pad 2a is selected among the pads with maximum X coordinate, because its Y coordinate is maximum, and pad 2b is selected among the pads with maximum Y coordinate, because its X coordinate is maximum. Like-wise, pad 2c is selected among the pads with minimum X coordinate, because its Y coordinate is minimum, and pad 2d is selected among the pads with minimum Y coordinate, because its X coordinate is minimum.

Figure 11:
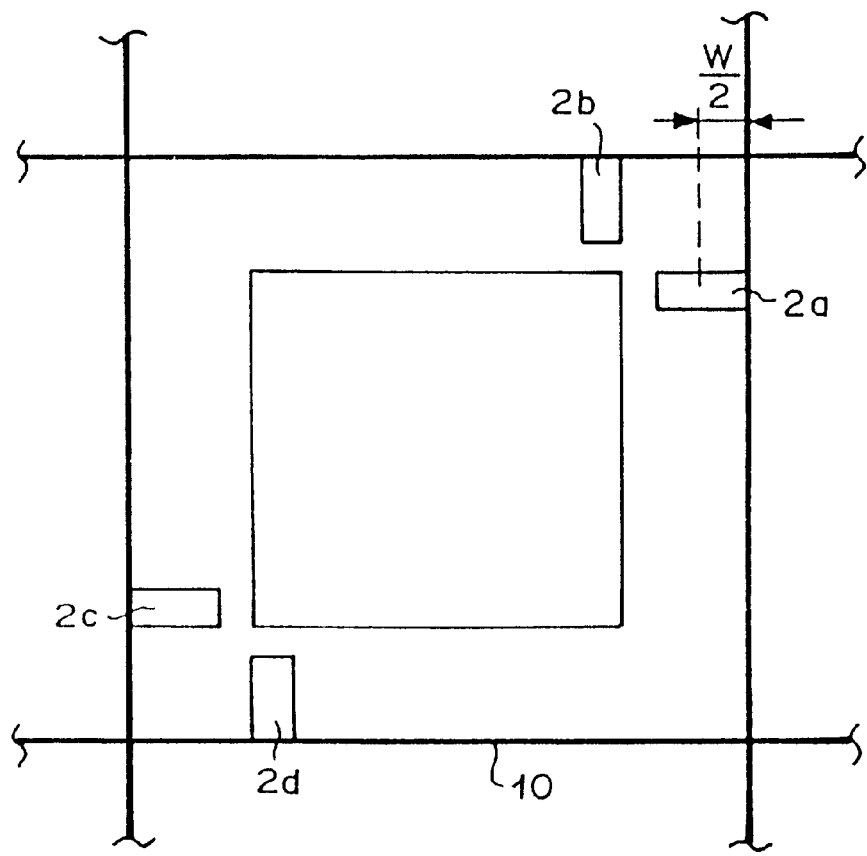
FIG. 11 is a flow chart of step B3 in the first embodiment of the present invention.
Figure 12:
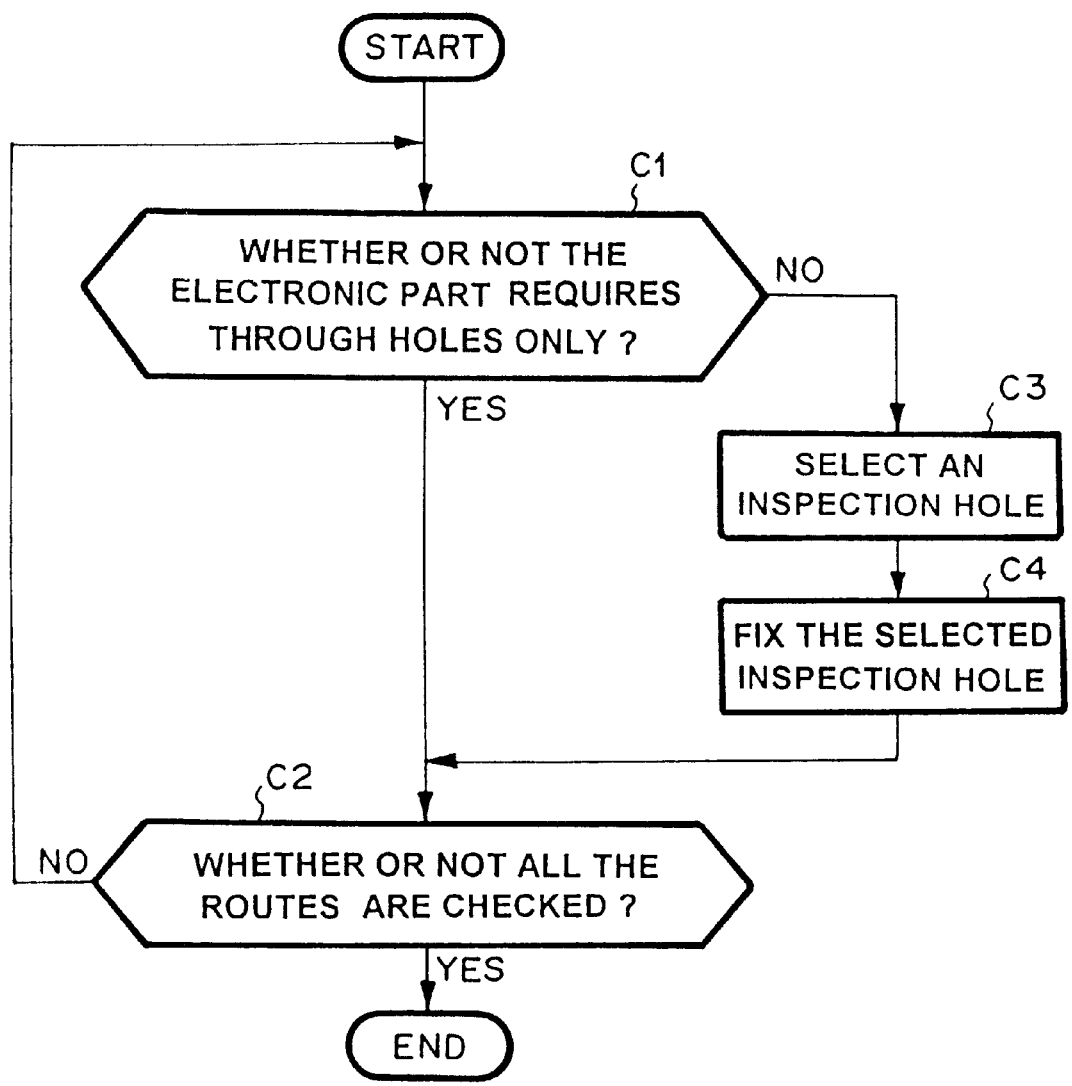
FIG. 12 is a flow chart of step A6 in the first embodiment of the present invention.

The data of the representative pads determined in step B2 are acquired from library 202, and then four lines are drawn in step B3, as shown in FIGS. 1,10 and 11. The region surrounded by the four lines is the mounting region for part 1. Concretely, the above-mentioned four lines are the tangents to the edges of the representative pads, because a half of W which is the length of the pad in the longitudinal direction is added to the coordinate of each pad, so that the absolute value of the coordinate is increased.

Another method to generate the above-mentioned four lines is to draw lines, passing through the center of each representative pad, parallel to each side of the electronic part and to translate them by W/2 toward the direction distant from the electronic part.

Next, the process in step A5 is explained in detail.

Through holes are checked along each distribution line to confirm whether or not the part requires, as a DIP or a connector does, nothing but one or more though holes in step C1.

When the electronic part is found to require nothing but one or more though holes, it is judged whether or not all the distribution lines have been already searched in step C2. If all the distribution lines have not yet been searched, the process goes back to step C1.

When the electronic part is not found to require nothing but one or more though holes, one of the inspection through holes on this distribution line is chosen randomly in step C3.

The data of inspection through holes chosen in step C3 are stored in electronic parts library 202, so as not to be deleted nor moved in step C4.

When all the distribution lines have been searched, step A5 is finished.

Thus, in the first embodiment of the present invention, inspection through holes 3 and 3' are located automatically at the positions which can be inspected by the jig, because prohibition region generation means 101 generates prohibition regions where any inspection terminal should not be provided, and through hole position determination means 102 determines positions for inspection through holes at regions excluding the prohibition regions generated by prohibition region generating means 101.

Next, the second embodiment of the present invention is explained, referring to FIG. 13.

As shown in FIG. 13, recording medium 500 which records a program for determining the positions of inspection terminals is provided. Recording media 500 may be magnetic disk or semiconductor memory.

The program is read out from recording medium 500 by computer 400 which then executes the same processes as computer 100 does in the first embodiment of the present invention.

Computer 400 generates prohibition regions where any inspection terminal should not be provided and next, determines positions for inspection through holes at regions excluding the prohibition regions and next, fixes the determined through holes so as not to be deleted nor moved during wiring process. Computer 400 also displays the arranged electronic parts and the fixed inspection through holes on display device 300.

After the determination of inspection through holes, according to the equipment, method or program of the present invention, wiring pattern is determined. Inspection through holes may be used for wiring. In this case, it is judged whether or not any inspection hole is connected with the pad which lies on the wiring route. Inspection through holes can be used for wiring, when any inspection hole is not connected with the pad. Thus, wiring region is simplified by preferential usage of inspection holes for wiring.

Any form of expression of coordinates in the conventional CAD system can be used, although the positions of pads 2 and 2' are expressed in terms of the coordinates of their centers as explained above in the embodiments of the present invention. In some cases, the difference W between X coordinates is expressed in terms of its absolute value.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. An equipment for automatically determining positions of inspection terminals with which an inspection jig is contacted to inspect electronic parts mounted through pads on a printed wiring board, which comprises:

a memory device that stores information about arrangements of said electronic parts and said pads, and jig information about characteristics of said inspection jig;

a prohibition region generator that generates, by using said arrangement information and said jig information, prohibition regions where said inspection terminals should not be provided; and an inspection hole determination device that determines positions of said inspection terminals in regions excluding said prohibition regions.

2. The equipment for determining positions of inspection terminals according to claim 1, wherein said prohibition region generator comprises:

a mounting region generator that acquires, by using said arrangement information, mounting regions which include the electronic parts and the pads; and an enlargement device that enlarges said mounting regions on the basis of said inspection jig information.

3. The equipment for determining positions of inspection terminals according to claim 2, wherein said jig information includes such minimum clearance that the inspection jig is apart from the pad; and said enlargement device enlarges the mounting regions by said minimum clearance.

4. The equipment for determining positions of inspection terminals according to claim 2, wherein said mounting region generator:

acquires representative pads which represent the pads which stand in line along the peripheries of the electronic parts;

acquires four lines which are parallel to the row of the pads and are tangent to the edge of the representative pads; and acquires a region surrounded by the four lines as the mounting region.

5. The equipment for automatically determining positions of inspection terminals according to claim 1, which includes an electronic parts judgement device that judges whether the inspection terminals can be provided beneath the electronic parts on the printed wiring board, wherein said electronic parts judgement device excludes, from the prohibition region, a region surrounded by lines distant by a prescribed distance from edges of said electronic parts toward the inner sides of the electronic parts, when said inspection terminals can be provided beneath the electronic parts on the printed wiring board.

6. The equipment for determining positions of inspection terminals according to claim 1, which includes an inspection terminal fixer that prevents positions of the inspection terminals determined by said inspection terminal determination device from being deleted or moved.

7. The equipment for determining positions of inspection terminals according to claim 1, which includes a wiring device that wires the printed wiring board, which judges whether the pads included in wiring paths are coupled with the inspection terminals, wherein the inspection terminals are used as wiring terminals, when the pads included in wiring paths are connected with the inspection terminals.

8. The equipment of claim 1, said memory device comprising:

a parameter file that supplies design data to said prohibition region generator and said inspection hole determination device; and a parts library that stores design data of electronic parts and pads.

9. The equipment of claim 8, wherein parameters of said parameter file comprise part identification information, minimum clearance data and a permission flag.

10. The equipment of claim 1, further comprising:

a display processor coupled to said memory device and a computer comprising said prohibition generator and said inspection hole determination device, said display processor receiving a signal from said memory device and said computer to generate a display signal; and a display device that receives said display signal and generates an output at a user interface.

11. The equipment of claim 1, further comprising a recording medium coupled to a computer comprising said prohibition generator and said inspection hole determination device, said recording medium storing an inspection program for use by said computer.

12. The equipment of claim 11, wherein said recording medium comprises at least one of a magnetic device and a semiconductor device.

13. A method for automatically determining positions of inspection terminals with which an inspection jig is contacted to inspect electronic parts mounted through pads on a printed wiring board, which comprises the steps of:

storing arrangement information about the electronic parts and the pads, and jig information about characteristics of the inspection jig;

generating, by using said stored arrangement information and said information, prohibition regions where said inspection terminals are prohibited to be provided; and determining said positions of said inspection terminals in regions excluding said prohibition regions, wherein an inspection terminal fixer prevents positions of said inspection terminals from being moved or deleted.

14. The method of claim 13, said generating step comprising:

determining whether an inspection through hole can be formed beneath said electronic part;

(a) generating said mounting regions for said electronic parts and said pads in accordance with aid arrangement information; and (b) generating said prohibition regions by adding a minimum clearance value to said mounting regions in accordance with said jig information, wherein new borders are generated to form new regions inside said mounting regions if said inspection through hole can be formed beneath said electronic part, and said new regions are excluded from said prohibition regions.

15. The method of claim 14, said generating step (a) comprising:

sorting coordinate information of said pads;

identifying representative pads in each row surrounding each of said electronic parts in accordance with values of said coordinate information, said representative pads being positioned at corners of said electronic parts; and forming boundaries of said mounting regions in accordance with said arrangement information corresponding to said representative pads.

16. The method of claim 13, said determining step comprising:

positioning said inspection terminals at a minimum distance from said pads and adjacent to said prohibition region, in accordance with one of an iteration method and a fan-out function;

fixing and storing positions of said inspection terminals to prevent deletion or alteration of said positions of said inspection terminals; and displaying, in a user interface, an output indicative of positions of at least one of said electronic parts, pads, inspection regions and an escape wire formed between said prohibition regions and said inspection regions.

17. The method of claim 16, said fixing and storing step comprising:

determining whether said electronic parts require said inspection regions and generating a decision;

selecting and inspecting one of said inspection regions in accordance with said decision; and storing data of said selected inspection region in a memory device, wherein said determining, selecting and storing steps are repeated for all distribution lines of said printed wiring board.

18. A computer program product for automatically determining positions of inspection terminals with which an inspection jig is placed to inspect electronic parts mounted through pads on a printed wiring board, which comprises a computer useable medium having computer program logic stored therein, which includes the steps of:

storing arrangement information about the electronic parts and the pads, and jig information about characteristics of the inspection jig;

generating, by using said stored arrangement information and said jig information, prohibition regions where the inspection terminals should not be provided; and determining the positions of the inspection terminals in regions excluding the prohibition regions.

19. The method of claim 18, said generating step comprising:

determining whether an inspection through hole can be formed beneath said electronic part;

(a) generating said mounting regions for said electronic parts and said pads in accordance with said arrangement information, said generating step (a) further comprising, sorting coordinate information of said pads, identifying representative pads in each row surrounding each of said electronic parts in accordance with values of said coordinate information, said representative pads being positioned at corners of said electronic parts, and forming boundaries of said mounting regions in accordance with said arrangement information corresponding to said representative pads; and (b) generating said prohibition regions by adding a minimum clearance value to said mounting regions in accordance with said jig information, wherein new borders are generated to form new regions inside said mounting regions if said inspection through hole can be formed beneath said electronic part, and said new regions are excluded from said prohibition regions.

20. The method of claim 18, said determining step comprising:

positioning said inspection terminals at a minimum distance from said pads and adjacent to said prohibition region, in accordance with one of an iteration method and a fan-out function;

fixing and storing positions of said inspection terminals to prevent deletion or alteration of said positions of said inspection terminals, said fixing and storing step comprising, determining whether said electronic parts require said inspection regions and generating a decision, selecting and inspecting one of said inspection regions in accordance with said decision, storing data of said selected inspection region in a memory device, and repeating said determining, selecting and storing steps for all distribution lines of said printed wiring board; and displaying an output indicative of positions of at least one of said electronic parts, pads, inspection regions and an escape wire formed between said prohibition regions and said inspection regions, said output being displayed in a user interface.

* * * * *